United States Patent
Grunkemeyer et al.

(10) Patent No.: US 7,610,322 B2
(45) Date of Patent: Oct. 27, 2009

(54) SAFE HANDLE

(75) Inventors: Brian M. Grunkemeyer, Issaquah, WA (US); David Sebastien Mortenson, Redmond, WA (US); Rudi Martin, Redmond, WA (US); Sonja Keserovic, Kirkland, WA (US); Mahesh Prakriya, Redmond, WA (US); Christopher W. Brumme, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 298 days.

(21) Appl. No.: 10/853,420

(22) Filed: May 25, 2004

(65) Prior Publication Data

US 2006/0004805 A1    Jan. 5, 2006

(51) Int. Cl.
*G06F 12/00*  (2006.01)
*G06F 17/30*  (2006.01)
*G06F 7/00*   (2006.01)
*G06F 17/00*  (2006.01)
*G06F 13/00*  (2006.01)
*G06F 13/28*  (2006.01)

(52) U.S. Cl. ............ 707/206; 707/1; 707/100; 707/201; 711/150; 711/151; 711/152

(58) Field of Classification Search ............ 707/1, 707/201; 716/3; 714/4; 717/141; 711/209
See application file for complete search history.

(56) References Cited

U.S. PATENT DOCUMENTS

| | | | |
|---|---|---|---|
| 5,367,671 A | | 11/1994 | Feigenbaum et al. |
| 5,765,154 A | * | 6/1998 | Horikiri et al. ............ 707/10 |
| 5,909,580 A | * | 6/1999 | Crelier et al. ............ 717/141 |
| 5,983,213 A | * | 11/1999 | Nakano et al. ............ 707/1 |
| 5,995,964 A | * | 11/1999 | Hoshiina et al. ............ 707/6 |
| 6,542,926 B2 | * | 4/2003 | Zalewski et al. ............ 709/213 |
| 6,578,129 B1 | * | 6/2003 | da Silva Junior et al. .... 711/209 |
| 6,636,874 B1 | * | 10/2003 | Douceur et al. ............ 707/201 |
| 6,654,171 B1 | | 11/2003 | Hampel-Vogedes |
| 6,704,743 B1 | * | 3/2004 | Martin ............ 707/103 R |
| 2002/0004917 A1 | * | 1/2002 | Malcolm et al. ............ 714/4 |
| 2002/0174405 A1 | * | 11/2002 | Janssen ............ 716/3 |

* cited by examiner

*Primary Examiner*—Mohammad Ali
*Assistant Examiner*—Patrick A Darno
(74) *Attorney, Agent, or Firm*—Lee & Hayes, PLLC (57) ABSTRACT

Enabling secure and efficient marshaling, utilization, and releasing of handles in either of an operating system or runtime environment includes wrapping a handle with a counter to tabulate a number of threads using currently using the handle. Thus, handle administration is implemented to circumvent potential security risks, avoid correctness problems, and foster more efficient handle releasing.

23 Claims, 6 Drawing Sheets

SAFE HANDLE

FIELD

The present invention is directed towards a safe handle wrapper for handles.

BACKGROUND

Modules operating on computer systems typically require access to shared resources. As examples, an application launched by an operating system may require access to files that are maintained by a file system, or the application may require access to network connections maintained by a network driver. Network drivers may require access to information structures maintained by a network packet classifier. This is a complex arrangement that includes numerous software modules, such as software drivers requiring access to many shared resources and an access supervisor that either maintains the resources or at least intercedes when a software module attempts to access a resource.

Intercession by an access supervisor is important for several reasons. For instance, when a first software module deletes a resource, other software modules that maintain direct pointers to the resource are unable to access or use the resource because their pointers no longer point to a valid resource. One solution to this problem is notifying software modules when a resource deletion occurs. However, this proposed solution requires detailed accounting and tracking of software modules and their respective pointers to the resources.

Another solution to this problem involves having an access supervisor intervene when a software module requires access to a particular resource. Such intervention ensures that a particular resource still exists before the software module is granted access to the particular resource. Typically, such intervention is accomplished by the access supervisor issuing a handle to each software module for a particular resource instead of allowing each software module a direct pointer to that particular resource.

A handle is associated with a resource and is used to refer to a particular resource when it is desired to be used by a software module. The software module does not use the handle to directly access the resource. Rather, the software module makes requests to the access supervisor for operations to be performed on the resource. The handle is presented as part of these requests to identify the resource that should be operated on. Further, multiple threads of a single program may request that operations be performed on the same resource by specifying the same handle to the access supervisor.

Handle administration systems are typically characterized by having handles that can assume either an allocated state or an unallocated state.

When a handle is in the allocated state, the access supervisor has associated that handle with a resource. The handle can then be used by a software module when the software module desires to perform an operation on the resource. To perform an operation on the resource, the software module makes a request to the access supervisor for a given operation and provides the handle to identify the resource on which the operation is to be performed. The access supervisor then checks to determine whether the handle is valid. If the handle is valid, then the operation may be performed. If the handle is not valid, then an appropriate notification to the software module may be generated.

When a handle is in the unallocated state, it is not associated with any resource and thus cannot be used to access a resource. A handle is in the unallocated state if it is never allocated or when it is "released." A handle can be released by the software module that allocated it from the access supervisor. Releasing a handle means that the handle is no longer being used to access the resource with which it was formerly associated. Once a handle is released, it is available to be associated with another resource and thereby returned to the allocated state.

However, handles are not always released properly, and the consequences of an improper handle release can be quite costly in terms of performance and security. For example, a thread that opens a file may simply fail to close the file, resulting in a handle pointing to the file being leaked. Or, when a thread is terminated, a handle may fail to be released and the corresponding resource, to which the handle refers, may be leaked. Handle leaks like these can compromise program and overall computer performance over time, or simply cause a program to stop working.

Program security may further be compromised due to the eagerness by which handles are re-allocated. Such deficiencies are illustrated by the following example scenario in which Threads A and B concurrently execute semi-trusted code that requires access to the same publicly available file. Thread A may be assigned handle value X for the file, but execution of the semi-trusted code may switch to a different thread before a read operation is performed on the file. Thread B may then also use handle X for the same file, either maliciously or as a programming bug, perform a read operation on the file, close the file, and properly release handle X. Because handles are scarce resources, the access supervisor may soon thereafter allocate handle X to a Thread C, which executes fully trusted code. However, when Thread C reopens handle X, handle X may point to a completely different file. Therefore, when Thread A is re-started still using handle X, Thread A has access to the file intended for Thread C. Thus, thread management with semi-trusted code may result in security vulnerabilities in a multithreaded environment.

SUMMARY

Safe handles to implement safe, secure, and efficient management of handles are described herein.

Such management of handles includes wrapping a handle with a wrapper that enables, at least, secure and efficient creation, utilization, and releasing of handles.

BRIEF DESCRIPTION OF THE DRAWINGS

The detailed description is described with reference to the accompanying figures.

DETAILED DESCRIPTION

The following description is directed to techniques for efficiently and securely allocating, releasing, and re-allocating scarce resources such as handles. More particularly, a handle wrapper is described that eliminates certain resource leak vulnerabilities in a runtime environment and further eliminates certain handle recycling security vulnerabilities.

Figure 1:
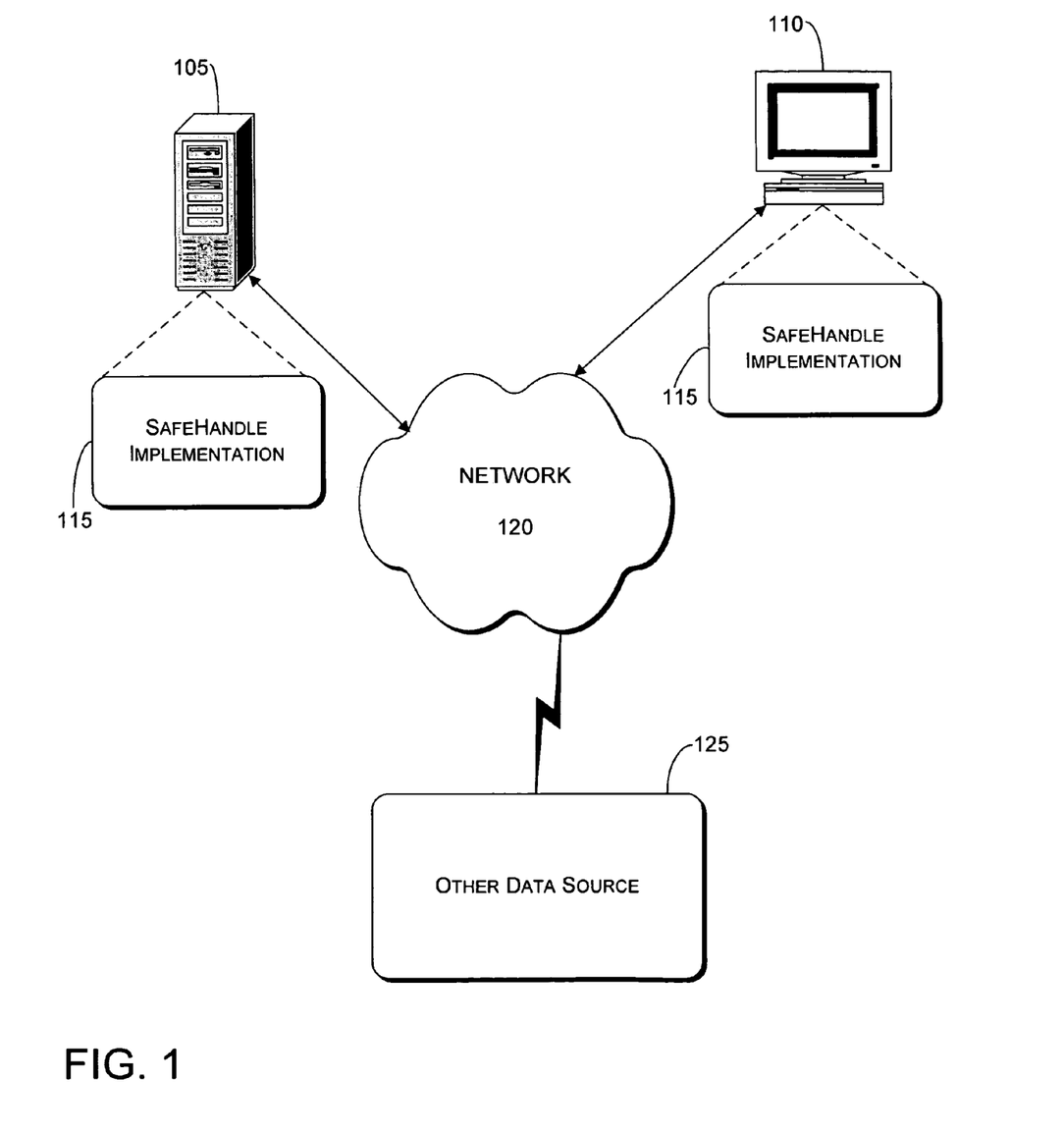
FIG. 1 shows a network environment in which example embodiments of safe handles may be implemented.

FIG. 1 shows server device 105 and client device 110 that are both capable of safe handle implementation 115, in either of an operating system (OS) environment or in a runtime environment, in accordance with the example embodiments described herein. Server device 105, client device 110, and other data source 125, which may also be capable of safe handle implementation, are communicatively coupled through network 120.

Server device 105 may provide any of a variety of data and/or functionality to client device 110. The data may be publicly available or alternatively restricted, e.g., restricted to only certain users or available only if an appropriate fee is paid. Server device 105 is at least one of a network server, an application server, a web blade, or any combination thereof. Other data source 125 may also be embodied by any of the above examples of server device 105. An example embodiment of server device 105 is described in further detail below with reference to FIG. 6.

Client device 110 may include any of a variety of conventional computing devices, including a desktop personal computer (PC), workstation, mainframe computer, Internet appliance, and gaming console. Further, client device 110 may be any device capable of being associated with network 120 by a wired and/or wireless link, including a personal digital assistant (PDA), laptop computer, cellular telephone, etc. Further still, client device 110 may include the client devices described above in various quantities and/or combinations thereof. Other data source 125 may also be embodied by any of the above examples of client device 110. An example embodiment of client device 110 is also described in further detail below with reference to FIG. 6.

Network 120 is intended to represent any of a variety of conventional network topologies, which may include any wired and/or wireless network. Network 120 may further utilize any of a variety of conventional network protocols, including public and/or proprietary protocols. For example, network 120 may include the Internet, an intranet, or at least portions of one or more local area networks (LANs).

Typically, server device 105 includes any device that is the source of content, and client device 110 includes any device that receives such content either via network 115 or in an off-line manner. However, according to the example embodiments described herein, server device 105 and client device 110 may interchangeably be a sending host or receiving host.

Figure 2:
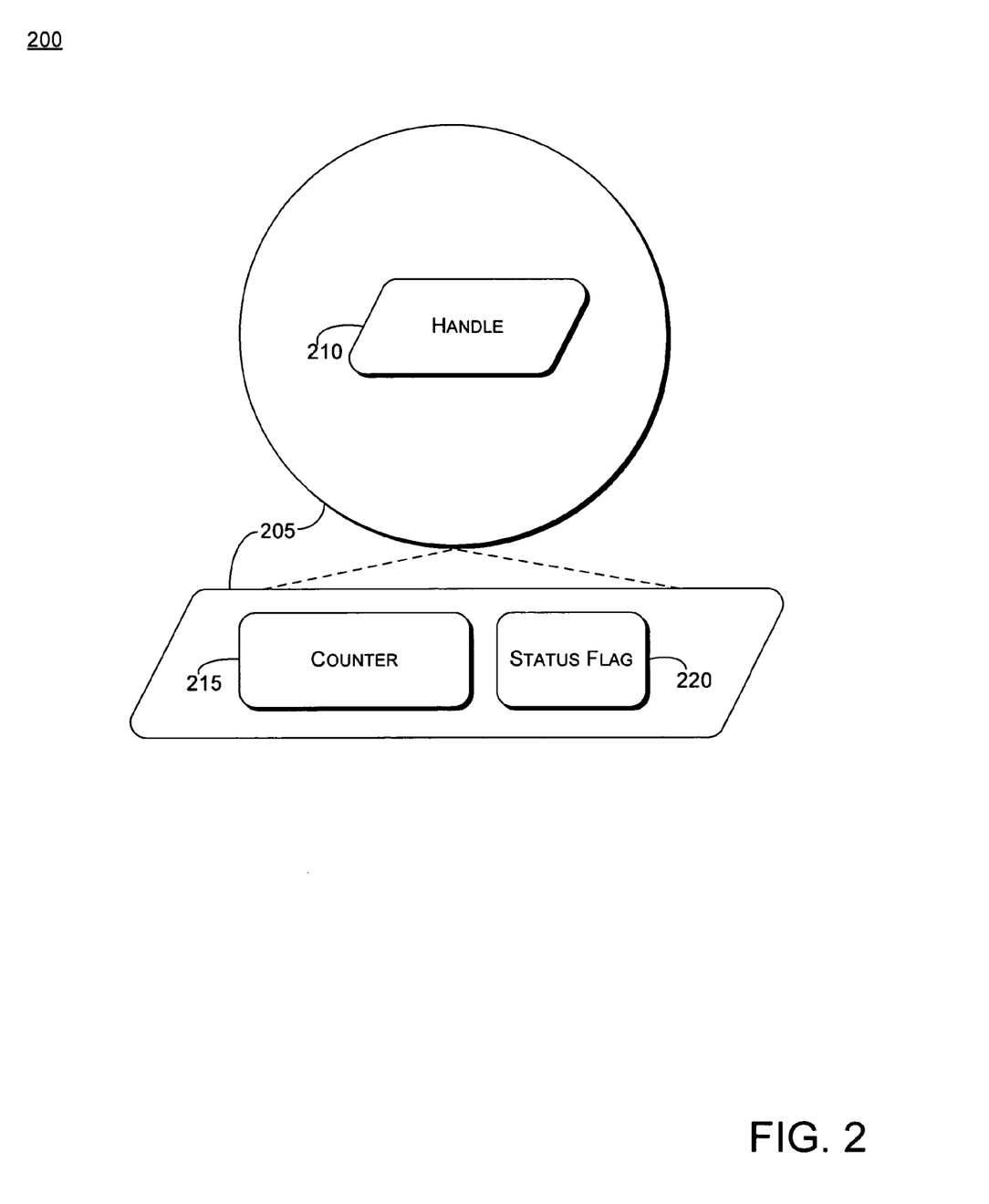
FIG. 2 shows an example of a safe handle.

FIG. 2 shows an example embodiment of a "safe handle" 200 that is allocated for an agent requesting access to a resource in order to perform an operation on the resource. An agent is typically a software module that requires access to at least one resource in order for an operation to be performed. Such agents may be OS modules or runtime modules, and examples of such agents include dynamic link libraries (DLLs) and executable programs. The aforementioned resources may be any resource for which handles are used. Examples of such resources include files, data structures, or objects that are manipulated by agents.

More particularly, handle 210 is an identifier used to specify a resource on which operations are to be performed. Multiple possible representations of such identifier may exist. One such representation is an element in a handle database. A handle database may be used by a handle administrator to manage various handles (e.g., operating system handles) that may be used to access resources. Another possible representation is a pointer to the resource. To allocate a handle to a requesting agent, the handle administrator typically receives a call from the requesting agent. The handle administrator then establishes a relationship between the handle and the resource that the handle represents. The handle administrator then returns the handle to the requesting agent, and, thereafter, the handle is used to identify the resource on which an operation is to be executed. If the handle is valid, the operation requested by the requesting agent may be successful.

The handle may be released by the requesting agent when it is done performing operations on the resource it represents. As set forth above, releasing the handle means that the handle is no longer being used to access the resource with which it was formerly associated. A released handle is available to be associated with another resource and thereby returned to the allocated state. However, as further mentioned above, handles are not always released properly, and the consequences of an improper handle release can be quite costly in terms of performance and security.

Examples of the costly consequences of an improper handle release include a handle not being released when a thread is terminated, resulting in the handle being leaked; or a handle being released by only one of multiple threads using the same handle, resulting in security being compromised for the other threads.

As an example, consider CLR (common language runtime) on the Microsoft® .NET platform, which enables interaction of managed code with unmanaged code (e.g., Win32). In this environment, unmanaged code typically serves as a handle administrator, and therefore interacts with managed code to utilize the aforementioned resources. Without appropriate safeguards, the managed code may be interrupted before being able to properly release a handle obtained from the handle supervisor.

More particularly, a handle that is detected by the handle administrator as not being used, even though the handle is tentatively released or otherwise suspended, may be closed, disposed, or subjected to some other finalizing method for the purpose of memory management or resource recycling. For example, in the Microsoft® .NET platform, the managed method of "garbage collection" aggressively cleans up unused objects to reclaim memory. However, if garbage collection occurs prematurely on a type containing a handle and that type provides a finalizer that frees the handle, security of the corresponding resource and performance of a corresponding program can be severely compromised. The finalizer releases the resource and invalidates the handle. While resource release during finalization is normally expected, if the object was prematurely finalized (or disposed), another thread could still be using the contained handle of the object, which is now invalid. Further, a handle administrator (such as an operating system) enables a handle to be recycled, and thus the handle may be reallocated potentially with a different level of security, allowing a thread that used a prematurely finalized object to potentially access a different resource that it may not have permission to access. This is both a correctness and security problem.

To address at least these concerns described above, the example embodiment of a "safe handle" 200 in FIG. 2 further includes wrapper 205 encircling handle 210. Wrapper 205 is either a data structure or software that contains, or wraps around, handle 210. According to the present embodiment, wrapper 205 contains counter 215 to tabulate the number of threads currently using handle 210. Alternative embodiments of wrapper 205 may further contain status flag 220 to indicate a current management status of handle 210.

Figure 3:
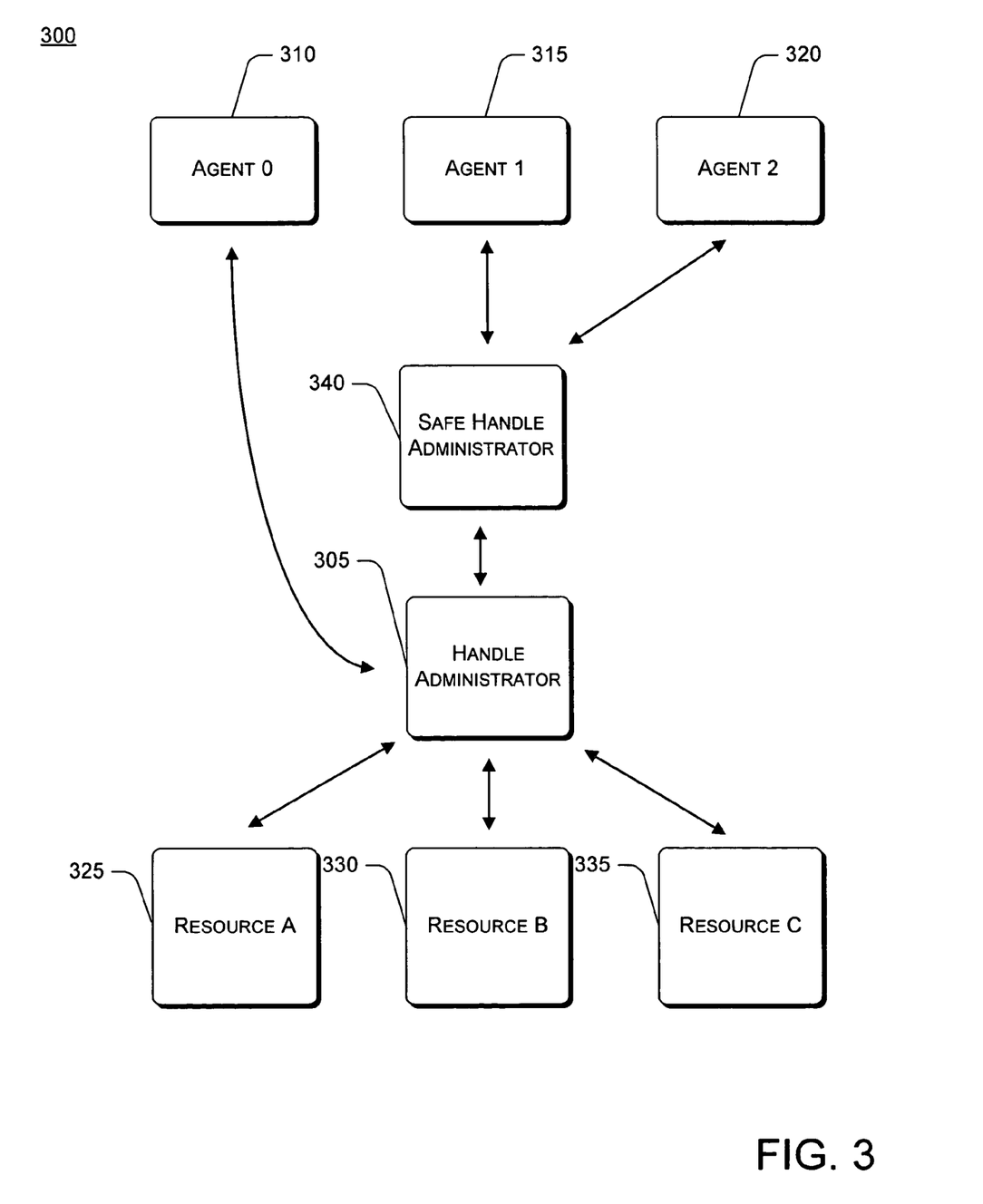
FIG. 3 is a high level block diagram of an example of a handle administration system in accordance with the described embodiments.

FIG. 3 shows an example embodiment of handle administration system 300 to implement safe handle 200 (see FIG. 2). Handle administrator 305, which may correspond to a resource or access manager (not shown), may be implemented in any suitable hardware, software, firmware or combination thereof. A plurality of different agents 310, 315, and 320 are shown as consumers of resources 325, 330, and 335.

As set forth above, agents 310, 315, and 320 are typically software modules, such as dynamic link libraries (DLLs) or executable programs that require access to any of resources 325, 330, and 335 to perform an operation. More particularly, agent 310 may be an OS module, and agents 315 and 320 may be runtime modules for the purposes of explaining the present embodiment. In relation to FIG. 1, agents 310, 315, and 320 may be executable on server device 105 or client device 110, either collectively or in various combinations.

As stated above, resources 325, 330, and 335 may be any resource for which handles are typically used. Examples of such resources include files, network connections, data structures, memory, or objects that are manipulated by the software modules.

Agents 310, 315, and 320 may require access to one or all of the resources, and, therefore a handle for a respective one of resources 325, 330, and 335 may be allocated to one or more of agents 310, 315, and 320. In other words, a handle may be used by multiple threads, either as a matter of design or as a malicious attack vector.

Handle administrator 305, which may be an OS module, generates and validates handles to be allocated to agent 310 requesting access to at least one of resources 325, 330, and 335. Accordingly, handle administrator 305 uses handle 210 (see FIG. 2) to efficiently manage access to the resources 325, 330, and 335 on behalf of agent 310.

Safe handle administrator 340 may be a runtime module. As either of agents 315 or 320 request access to any one of resources 325, 330, or 335, safe handle administrator 340 generates safe handle object 200 for handle 210 (see FIG. 2), which may point to any one of resources 325, 330, or 335. Safe handle administrator 340 may be invoked to create safe handle object 200 upon recognition of a subclass of a safe handle in the runtime environment. That is, in the runtime environment, when either of agents 315 or 320 call for handle 210 from handle administrator 305, safe handle administrator 340 wraps handle 210 with wrapper 205. Wrapper 205 typically includes counter 215, though alternative embodiments may further include status flag 220. The interaction between safe handle administrator 340 and handle administrator 305 to safeguard a handle from an OS environment in a runtime environment may be referred to as marshalling.

More particularly, counter 215 is incremented to "1" as safe handle administrator 340 associates safe handle 200 with a handle 210. Counter 215 is then incremented by a value of 1 for every thread that begins executing an operation on the resource identified by the handle 210 and decremented by 1 when this operation is completed. When the requesting agent indicates it is done using the safe handle 200, either explicitly or as a consequence of memory management methods (such as finalization), counter 215 is also decremented by "1". Accordingly, safe handle administrator 340 is able to track the usage of handle 210, and thereby prevent inadvertent or premature release of handle 210. That is, when counter 215 is decremented to "0," safe handle manager 340 allows handle 210 to be released. Attempts at using safe handle 200 after counter 215 reaches 0 fail in a well defined manner.

As stated previously, in alternative embodiments of safe handle 200, wrapper 205 may include counter 215 and status flag 220. Status flag 220 is an optional field which contains additional information which may be used in the determination of when the handle 210 should be released. For example, expedited release of a handle may be requested by a module in lieu of waiting for memory management methods to notice that the resource is unused. An expedited handle release operation includes decrementing counter 215 by 1 and releasing the handle when counter 215 reaches 0, otherwise the handle will be released as the last thread using the handle finishes its operations and decrements counter 215 to 0. However, counter 215 alone may not be sufficient to provide secure operation in a partially trusted environment since a malicious module could request an expedited handle release operation more than once, thus causing counter 215 to reach 0 while other threads are still using the handle. Thus, status flag 220 may be provided to record that an expedited release has been requested and refusing all further such operations for the respective safe handle.

Figure 4:
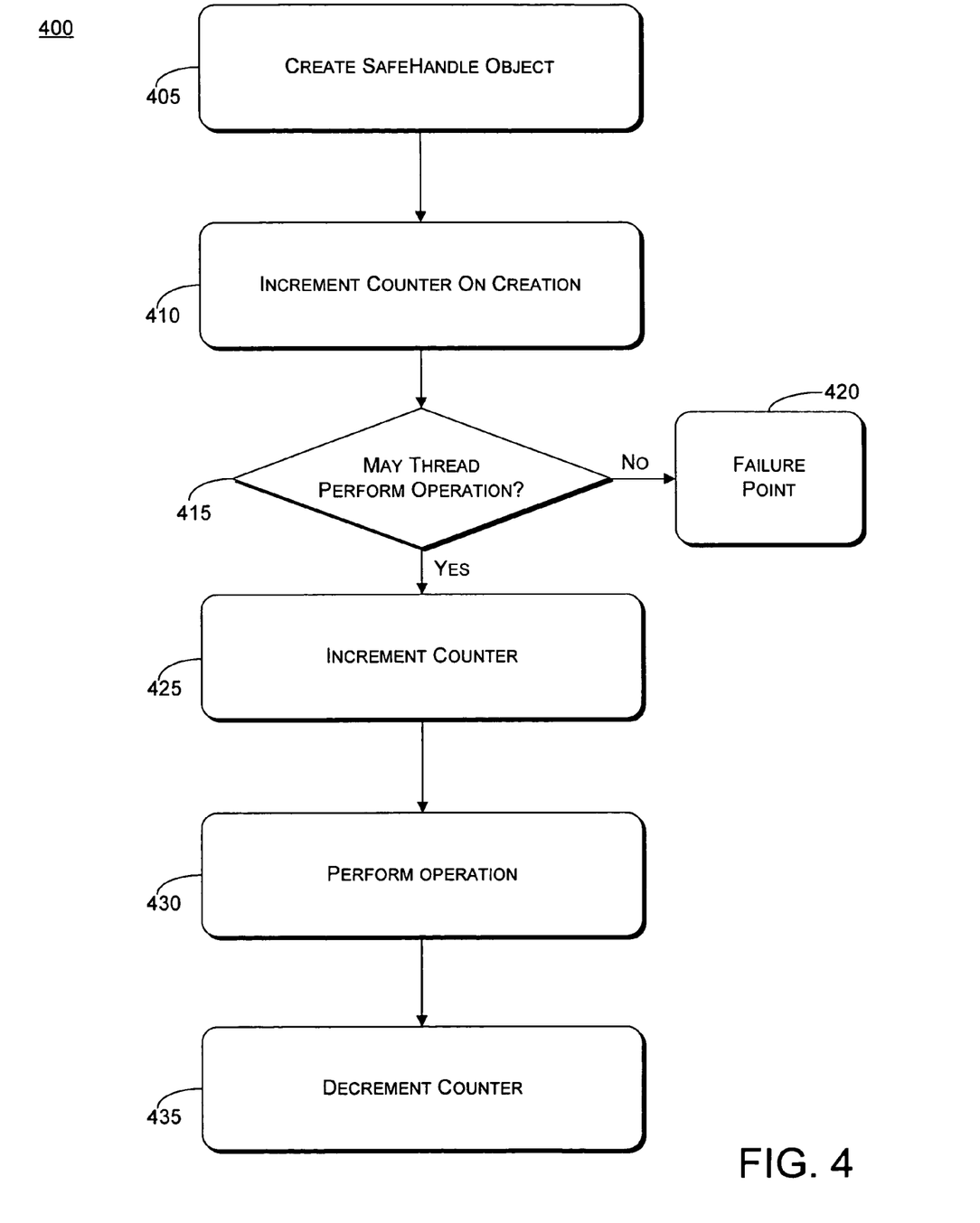
FIG. 4 shows an example processing flow for implementing a safe handle.

FIG. 4 shows an example processing embodiment 400 for implementing a safe handle, with reference to the safe handle embodiment of FIG. 3. Block 405 refers to an invocation by safe handle administrator 340 (see FIG. 3) to create safe handle object 200. That is, at block 405, a runtime environment may recognize the need to create an instance of a subclass of a safe handle, meaning that a safe handle is to be created for a runtime agent requiring a handle to access a resource upon which an operation is to be performed.

Block 410 refers to counter 215 being incremented to "1" as the runtime module referred to as safe handle administrator 340 (see FIG. 3) associates safe handle 200 with a handle 210. More particularly, wrapper 205 which includes counter 215 and possibly status flag 220 is wrapped around handle 210. This happens before any thread may perform an operation with newly created handle 210.

Decision block 415 refers to safe handle administrator 340 determining whether a requesting thread may perform an operation on a safe handle 200. More particularly, if safe handle administrator 340 determines that the value of counter 215 is 0 or that status flag 220 is set, then processing 400 proceeds to failure state 420 wherein usage of safe handle 200 fails.

Otherwise, block 425 refers to counter 215 being incremented by "1" before a particular thread performs an operation on the resource that safe handle 200 represents.

Block 430 refers to an operation occurring on the resource that safe handle 200 represents. As set forth above with regard to the particular example of the Microsoft® .NET platform, usage of safe handle 200 includes handle 210 being extracted from wrapper 205 in order to be passed to unmanaged code. The operation may be performed only after handle 210 is extracted from safe handle wrapper 205. It is noted that the extraction of handle 210 may be executed by any runtime environment or safe handle administrator, not only the aforementioned Microsoft® .NET platform.

Block 435 refers to counter 215 being decremented by "1" once the operation on the resource that safe handle 200 represents is completed. The operations of blocks 425, 430, and 435 occur for each thread that performs an operation on the resource represented by handle 210.

Figure 5:
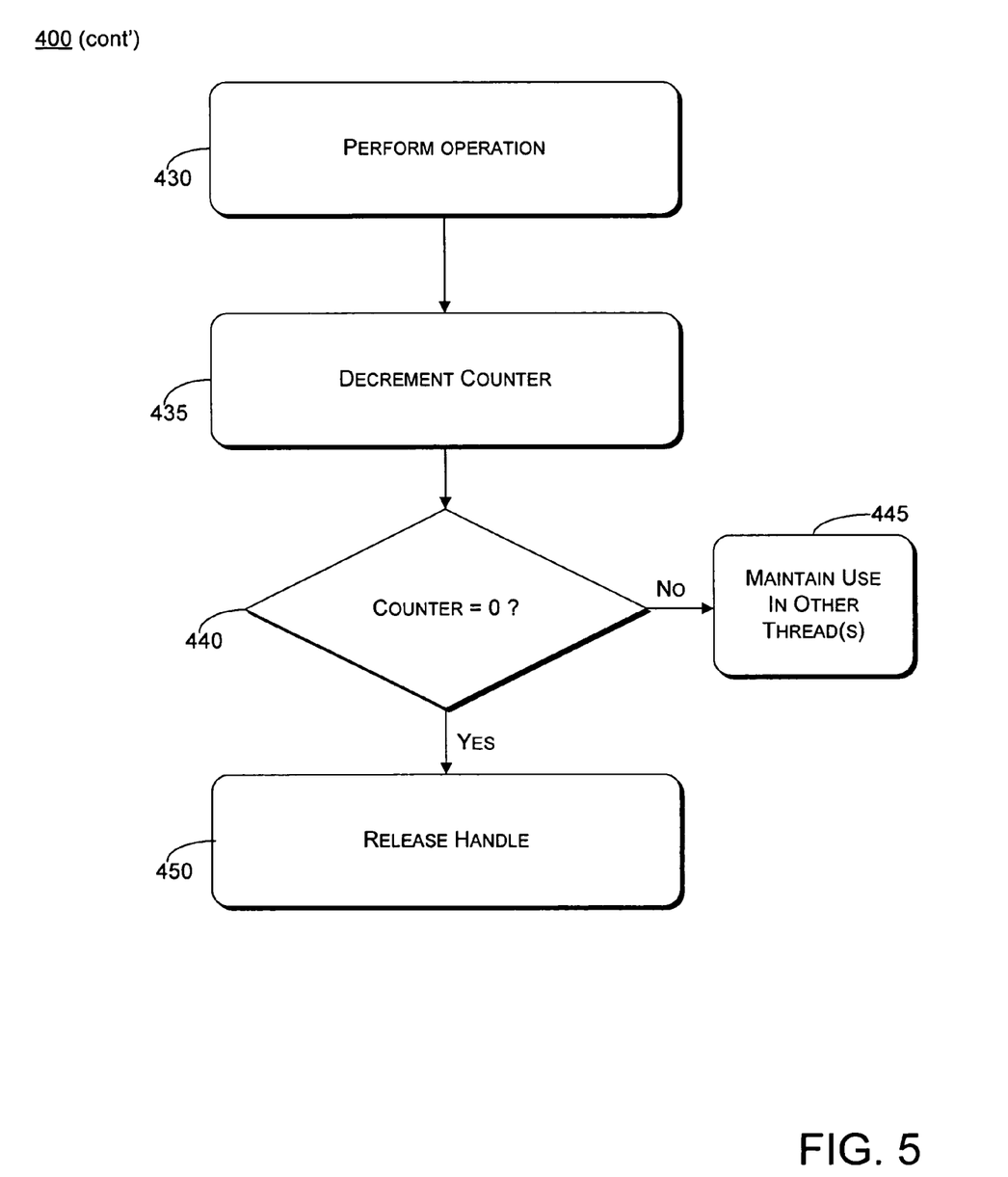
FIG. 5 shows a processing flow for implementing a safe handle further to the example of FIG. 4.

FIG. 5 continues processing flow 400 for implementing a safe handle further to the example of FIG. 4. In particular, the continuation of processing flow 400 in FIG. 5 is directed towards the secure re-allocation of handles.

As set forth above with regard to FIG. 4, block 430 refers to an operation occurring on the resource that safe handle 200 represents, and block 435 refers to counter 215 being decremented by "1" once the operation on the resource that safe handle 200 represents is completed.

Decision block 440 is attributed to safe handle administrator 340 (see FIG. 3) to check the status of counter 215 (see FIG. 2). Unless counter 215 is decremented to "0," safe handle administrator 340 will not allow the release of handle 210. Thus, if the counter is "1" or more, processing continues on towards block 445, whereby use of the handle is maintained for the other threads that are currently performing operations on the resource it represents. However, if counter 215 is decremented to "0," handle 210 is then released and made available for recycling at block 450, i.e., re-allocation for another agent requesting access to a resource. For the counter 215 to be decremented to "0", all threads should have completed any operations on the resource that the safe handle 200 represents and the requesting agent 310, 315 or 320 should indicate that it is done using the safe handle 200, either explicitly or as a consequence of memory management methods. As long as future attempts at using safe handle 200 fail (i.e., transition to failure state 420) and handle 210 has been exclusively used via safe handle 200, then handle recycling security vulnerabilities are virtually eliminated.

In the above discussions regarding FIGS. 4 and 5, the examples include incrementing and decrementing counter 315 by values of "1" and, further, safe handle administrator 340 allowing the release of handle 210 to occur only when counter 215 is at a base value of "0." However, such descriptions are by example only, and are not intended (nor should they be construed) to be limiting. For example, with each additional thread using handle 210, counter 215 may be incremented or even decremented by an integer value other than "1." Similarly, for each thread that releases handle 210, counter 215 may be decremented or even incremented by an integer value other than "1."

Figure 6:
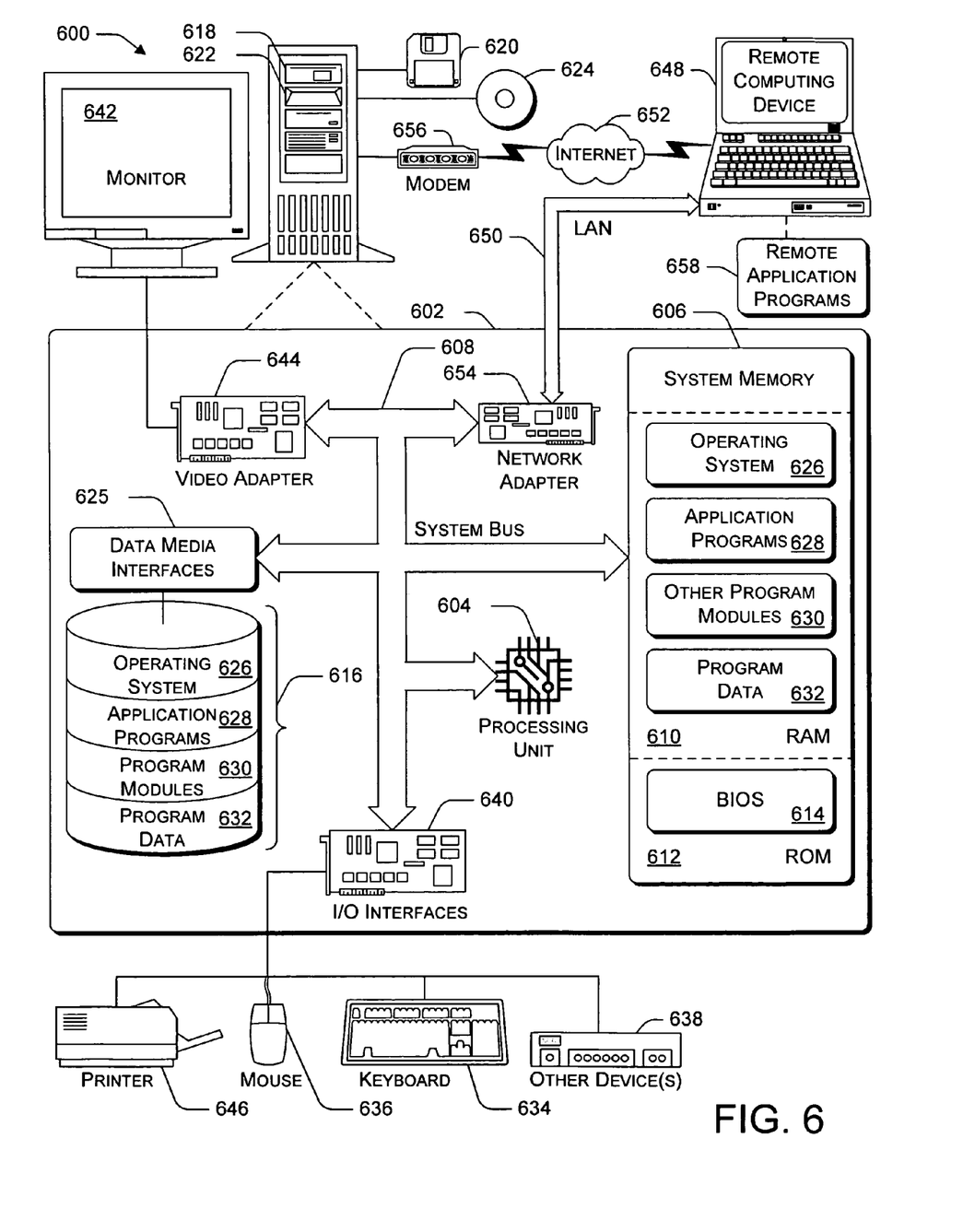
FIG. 6 illustrates a general computer network environment which can be used to implement the techniques described herein.

FIG. 6 illustrates a general computer environment 600, which can be used to implement safe handle 200 (see FIG. 2) described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing device in the form of a computer 602, which may include server device 105 or client device 110 (see FIG. 1). The components of computer 602 can include, but are not limited to, one or more processors or processing units 604, system memory 606, and system bus 608 that couples various system components including processor 604 to system memory 606.

System bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 602 may include a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610; and/or non-volatile memory, such as read only memory (ROM) 612 or flash RAM. Basic input/output system (BIOS) 614, containing the basic routines that help to transfer information between elements within computer 602, such as during start-up, is stored in ROM 612 or flash RAM. RAM 610 typically contains data and/or program modules that are immediately accessible to and/or presently operated on by processing unit 604.

Computer 602 may also include other removable/non-removable, volatile/non-volatile computer storage media. By way of example, FIG. 6 illustrates hard disk drive 616 for reading from and writing to a non-removable, non-volatile magnetic media (not shown), magnetic disk drive 618 for reading from and writing to removable, non-volatile magnetic disk 620 (e.g., a "floppy disk"), and optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, removable magnetic disk 620, and removable optical disk 624, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

Monitor 642 or other type of display device can also be connected to the system bus 608 via an interface, such as video adapter 644. In addition to monitor 642, other output peripheral devices can include components such as speakers (not shown) and printer 646 which can be connected to computer 602 via I/O interfaces 640.

Computer 602 can operate in a networked environment using logical connections to one or more remote computers, such as remote computing device 648. By way of example, remote computing device 648 can be a PC, portable computer, a server, a router, a network computer, a peer device or other common network node, and the like. Remote computing device 648 is illustrated as a portable computer that can include many or all of the elements and features described herein relative to computer 602. Alternatively, computer 602 can operate in a non-networked environment as well.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to local network 650 via network interface or adapter 654. When implemented in a WAN networking environment, computer 602 typically includes modem 656 or other means for establishing communications over wide network 652. Modem 656, which can be internal or external to computer 602, can be connected to system bus 608 via I/O interfaces 640 or other appropriate mechanisms. It is to be appreciated that the illustrated network connections are examples and that other means of establishing at least one communication link between computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, applications or programs and other executable program components such as the operating system are illustrated herein as discrete blocks, although it is recognized that such programs and components reside at various times in different storage components of computing device 602, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. One or more computer-readable storage media storing computer executable instructions, the media comprising:
    a handle configured to facilitate a software agent's reference to a particular computing resource, the particular computing resource being configured to be shared by more than one software agents within a computing environment, wherein:
        the more than one software agents include operating system modules and runtime modules;
        a handle administrator and a safe handle administrator interact with one another to safeguard the handle from an operating system environment in a runtime environment
    the handle administrator generating handles to be allocated to operating system modules and the safe handle administrator generating handles to be allocated to runtime modules; and
    a counter associated with the handle and configured to store a tabulation of a number of software agents currently using the handle to facilitate reference to the particular computing resource;
    one or more status flags configured to indicate when the counter has reached "0";
    another one or more status flags configured to:
        record when an expedited handle release has been requested by a software agent not currently using the handle; and indicate whether the handle is available for clean-up, wherein when the handle is not available for clean-up then the expedited handle release is refuse;

wherein the one or more status flags and another one or more status flags together indicate whether to release the handle.

2. One or more computer-readable storage media as recited in claim 1, wherein the counter accounts for each software agent that is using the handle and for the creation of a safe handle.

3. One or more computer-readable storage media as recited in claim 1, wherein the particular computing resource is selected from a group consisting of memory allocation, network connections, communication connections, input/output connections, file system, database, data structures, and objects.

4. One or more computer-readable storage media as recited in claim 1, wherein the counter is decremented when any software agent completes an operation on the particular computing resource to which the handle refers.

5. One or more computer-readable storage media as recited in claim 1, wherein the handle is configured to be used by a software agent in a runtime environment.

6. One or more computer-readable storage media as recited in claim 1, wherein the handle is configured to be used by a software agent in an operating system environment.

7. One or more computer-readable storage media storing computer-executable instructions that perform a method comprising:
   creating an instance of a subclass of a safe handle in a runtime environment, wherein a handle administrator and a safe handle administrator interact with one another to safeguard a handle from an operating system environment in the runtime environment, the handle administrator generating handles to be allocated to operating system modules and the safe handle administrator generating handles to be allocated to runtime modules, wherein the creating comprises:
      wrapping, using the safe handle administrator, the handle in the runtime environment, thereby creating a safe handle;
      storing a value associated with the safe handle, wherein the safe handle is configured to facilitate a software agent's reference to a particular computing resource, the particular computing resource being configured to be shared by more than one software agents within a computing environment, the more than one software agents including operating system modules and runtime modules;
      storing a value associated with a counter, wherein the counter is associated with the safe handle;
      managing the instance using the safe handle administrator, wherein the managing comprising:
         tabulating a quantity of software agents currently using the safe handle to facilitate reference to the particular computing resource;
         updating the counter in response to the tabulating;
         generating one or more status flags configured to indicate when the counter has reached "0"; and
         generating another one or more status flags configured to:
            record that an expedited handle release has been requested by a software agent not currently using the safe handle; and
            indicate whether the safe handle is available for clean-up, wherein if the safe handle is not available for clean-up, then the expedited handle release is refused;
   wherein the one or more status flags and the another one or more status flags together indicate whether to release the safe handle wrapped by the safe handle administrator.

8. One or more computer-readable storage media as recited in claim 7, wherein the particular computing resource is selected from a group consisting of memory allocation, network connections, communication connections, input/output connections, file system, database, data structures, and objects.

9. One or more computer-readable storage media as recited in claim 7, the method further comprising recognizing, in a runtime environment, a need to create the instance of a subclass of a safe handle.

10. One or more computer-readable storage media as recited in claim 7, wherein the value on the counter is indicative of a real-time count of the software agents currently performing operations on the particular computing resource to which the safe handle refers.

11. One or more computer-readable storage media as recited in claim 7, wherein the value on the counter is indicative of a lifetime count of the software agents who have performed operations on the particular computing resource via the handle's reference.

12. One or more computer-readable storage media as recited in claim 7, wherein the method further comprises extracting the handle for passing to the handle administrator.

13. One or more computer-readable storage media as recited in claim 7, the method further comprising recognizing, in an operating system environment, a need to create the instance of a subclass of a safe handle.

14. A computer-implemented method comprising:
   operating on a computing device a system configuring the computing device to facilitate safe, secure, and efficient management of handles via operations comprising:
      recognizing a need to create an instance of a subclass of a safe handle;
      creating, in response to the recognizing, a subclass of a safe handle in a runtime environment, wherein a handle administrator and a safe handle administrator interact with one another to safeguard a handle from an operating system environment in the runtime environment, the handle administrator generating handles to be allocated to operating system modules and the safe handle administrator generating handles to be allocated to runtime modules;
      wrapping, using the safe handle administrator, the handle in the runtime environment, thereby creating a safe handle;
      counting, using the safe handle administrator, a number of software agents currently performing operations on a particular computing resource that the safe handle represents, wherein the counting is performed by a counter that is contained in a wrapper around the safe handle;
      determining, using the safe handle administrator, whether an operation on the computing resource using the safe handle is authorized to be performed by a requesting software agent, the determining comprising:
         in an event that the value of the counter is "0", proceeding to a failure state not allowing the requesting software agent to use the safe handle;

in an event that the value of the counter is "1" or more, proceeding to allow the requesting software agent to use the safe handle, and incrementing the counter by one;

performing the operation using the safe handle; and upon completion, decrementing the counter;

preventing, using the safe handle administrator, a release of the safe handle unless the number of software agents using the safe handle achieves a designated threshold and an operation performed on the particular computing resource represented by the safe handle is completed, wherein preventing a release of the safe handle comprises:

generating one or more status flags configured to indicate when the counter has reached the designated threshold; and generating another one or more status flags configured to:

record that an expedited handle release has been requested by a software agent not currently using the safe handle; and indicate whether the safe handle is available for clean-up, wherein if the handle is not available for clean-up then the expedited handle release is refused; and indicating that the safe handle is available for clean-up when the one or more status flags indicates that the counter has reached the designated threshold and the another one or more status flags indicates the safe handle is available for clean-up.

15. A method as recited by claim 14, wherein the particular computing resource is selected from a group consisting of memory allocation, network connections, communication connections, input/output connections, file system, database, data structures, and objects.

16. A method as recited by claim 14, wherein the clean-up includes freeing the particular computing resource to which the safe handle refers.

17. A method as recited by claim 14, wherein the clean-up is a finalization.

18. Presented) A method as recited by claim 14, wherein the designated threshold is zero (0).

19. A method as recited by claim 14, wherein the indicating is performed by a status flag that is contained in the wrapper around the safe handle.

20. An administrator comprising:

a processing unit;

a memory storing computer-executable instructions to be executed by the processing unit;

means operable by the processing unit for counting, using a safe handle administrator, a number of software agents currently using the safe handle, the one or more software agents including operating system modules and runtime modules;

means operable by the processing unit for creating, in response to the recognizing, a subclass of a safe handle in a runtime environment, wherein a handle administrator and the safe handle administrator interact with one another to safeguard the safe handle from an operating system environment in the runtime environment, the handle administrator generating handles to be allocated to operating system modules and the safe handle administrator generating handles to be allocated to runtime modules;

means operable by the processing unit for wrapping, using the safe handle administrator, the handle in the runtime environment, thereby creating the safe handle;

means operable by the processing unit for determining, using the safe handle administrator, if the software agents requesting the safe handle are done performing operations on the particular computing resource that the safe handle represents;

means operable by the processing unit for indicating that the safe handle is available for release when the number corresponds to a base value;

means operable by the processing unit for generating one or more status flags configured to indicate when the number of software agents currently using the safe handle has reached the base value; and means operable by the processing unit for generating another one or more status flags configured to:

record that an expedited handle release has been requested by a software agent not currently using the safe handle; and indicate whether the safe handle is available for clean-up, wherein if the safe handle is not available for clean-up then the expedited handle release is refused;

wherein the one or more status flags and the another one or more status flags together indicate whether to release the safe handle.

21. An administrator as recited in claim 20, wherein the particular computing resource is selected from a group consisting of memory allocation, network connections, communication connections, input/output connections, file system, database, data structures, and objects.

22. An administrator as recited in claim 20, wherein the means operable by the processing unit for counting is a counter that is wrapped around the handle by the safe handle administrator.

23. An administrator as recited in claim 20, wherein the means operable by the processing unit for indicating is a status flag that is wrapped around the handle by the safe handle administrator.

* * * * *